(12) United States Patent
Faren

(10) Patent No.: US 6,293,171 B1
(45) Date of Patent: Sep. 25, 2001

(54) APPARATUS AND METHOD FOR STRIPPING WIRE

(75) Inventor: Jack V. Faren, Terrell, TX (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/177,209

(22) Filed: Oct. 22, 1998

(51) Int. Cl.[7] .................................................... H02G 1/12
(52) U.S. Cl. ............................................................ 81/9.4
(58) Field of Search ........................... 81/9.4, 9.41, 9.42, 81/9.43, 9.44, 426, 426.5; 30/90.1, 90.2, 90.3, 90.4, 91.2; 451/557, 552

(56) References Cited

U.S. PATENT DOCUMENTS

| | | | | |
|---|---|---|---|---|
| 110,162 | * | 12/1870 | Roorbach | 132/76.4 |
| 132,468 | * | 10/1872 | Jacobsohn | 132/76.4 |
| 156,173 | * | 10/1874 | Patterson | 424/629 |
| 408,926 | * | 8/1889 | Palmer | 433/1 |
| 448,409 | * | 3/1891 | Cassidy | 132/75.6 |
| 634,493 | * | 10/1899 | Bradley | 81/424.5 |
| 1,002,468 | * | 9/1911 | Strangman | 601/141 |
| 1,151,319 | * | 8/1915 | Wood | 81/9.43 |
| 1,562,083 | * | 11/1925 | Evans | 81/426 |
| 1,586,441 | * | 5/1926 | Blom | 132/76.4 |
| 1,707,879 | * | 4/1929 | Schwartzman | 132/75.6 |
| 2,233,438 | * | 3/1941 | Troya | 132/76.4 |
| 2,239,108 | * | 4/1941 | Lindemann | 81/426.5 |
| 3,751,176 | * | 8/1973 | Von Holleb | 408/144 |
| 3,768,138 | * | 10/1973 | Trapp | 29/270 |
| 3,956,950 | * | 5/1976 | Jamell | 81/426 |
| 4,111,076 | * | 9/1978 | Rocha et al. | 81/9.5 A |
| 4,333,214 | * | 6/1982 | Neumann et al. | 29/80 |
| 4,667,406 | * | 5/1987 | Krampe | 30/91.2 |
| 4,748,871 | * | 6/1988 | Zdzislaw | 81/9.4 |
| 4,892,015 | * | 1/1990 | Beetz et al. | 81/9.41 |
| 5,014,379 | * | 5/1991 | Hull et al. | 7/127 |

* cited by examiner

Primary Examiner—James G. Smith
Assistant Examiner—Hadi Shakeri

(57) ABSTRACT

An apparatus for, and method of, stripping insulation from an electrical wire. In one embodiment, the apparatus includes: (1) a stripping member having a curved, irregular surface thereon that is frictionally engageable with the insulation to apply a stripping force thereto and (2) a handle, coupled to an end of the stripping member, that allows a stripping force to be applied to the stripping member.

18 Claims, 1 Drawing Sheet

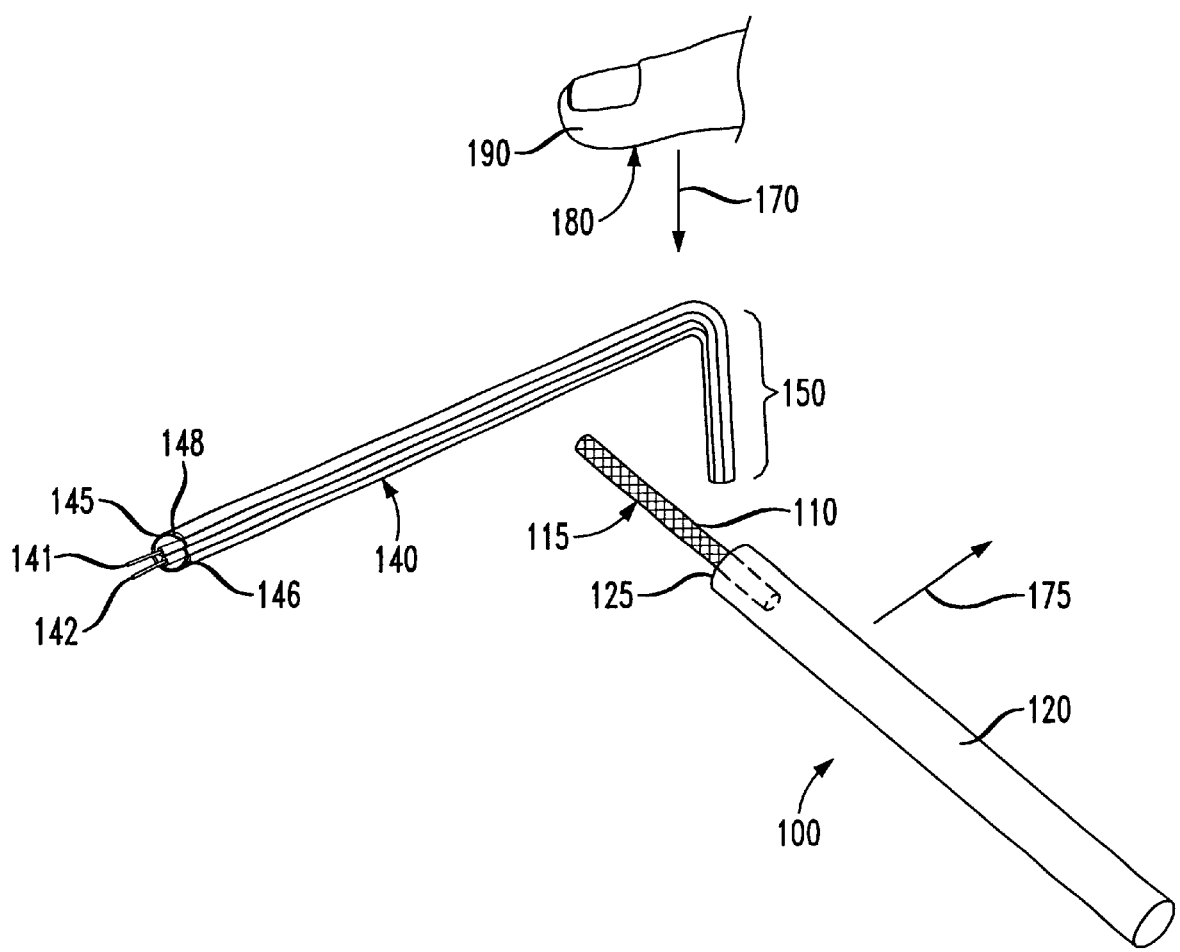

APPARATUS AND METHOD FOR STRIPPING WIRE

TECHNICAL FIELD OF THE INVENTION

The present invention is directed, in general, to a wire stripper and, more specifically, to a wire stripper, which may be referred to as a FARENSTRIPPER™, for thermocouple cable.

BACKGROUND OF THE INVENTION

In the specialized field of thermocouple manufacture, the stripping of insulation from 30/36 gauge (0.010"/0.005" diameter) wire presents a significant problem. In one embodiment, a thermocouple is formed from two dissimilar metal wires manufactured with a very thin insulation of TEFLON®, about each individual wire, with an additional insulation wrap about both wires.

To form the thermocouple, one who is skilled in the art must strip a length of insulation from both wires, then twist the bare wires and weld them. Because the wires are extremely delicate, they are easily damaged. A sharp edge on the stripping tool may cause a nick in the wire that will result in premature failure of the thermocouple.

Conventional, all-purpose, wire strippers, such as used by commercial electricians, are much too rugged for the delicate wires of a thermocouple. "No-nick", plier-like, stripping tools are available, but the precision available for stripping thermocouple cable is only useable on a single wire, necessitating splitting the outer insulation so that each wire may be stripped individually a tedious and time intensive process to remove three pieces of insulation.

It is also possible to use heat from a flame to burn the insulation away. However, this is very imprecise and somewhat dangerous. A specialized thermal wire stripper is available, but the retail price is in excess of $200—not very cost effective and not portable. One last resort for this process is to pinch the insulation between a finger and the thumbnail, and to pull the insulation off of the wires after removing the outer layer and splitting the conductor pair. Unfortunately, this method becomes difficult, time consuming, and the fingernail eventually wears from repeated usage.

Accordingly, what is needed in the art is an inexpensive wire stripping apparatus that reliably and simultaneously removes the insulation from both wires of duplex thermocouple cable without damaging the wire and to eliminate the need for replacement cutting blades.

SUMMARY OF THE INVENTION

To address the above-discussed deficiencies of the prior art, the present invention provides an apparatus for, and method of, stripping insulation from an electrical wire. In one embodiment, the apparatus includes: (1) a stripping member having a curved (perhaps cylindrical or conical), irregular surface thereon that is frictionally engageable with the insulation to apply a stripping force thereto and (2) a handle, coupled to (connected to or surrounding) an end of the stripping member, that allows a stripping force to be applied to the stripping member.

The present invention therefore introduces a simple, portable, perhaps one-piece tool, with no moving parts being necessary, for removing the insulation from a wire. For purposes of the present invention, "irregular surface" is defined as a surface (1) having bumps or indentations (perhaps knurls) of such number, height and/or depth that frictional engagement with insulation is sufficient to support a stripping force and (2) lacking sharp surface discontinuities that would tend to nick a wire while stripping it.

In one embodiment of the present invention, a radius of curvature of the surface is less than about 0.0625 inch. This translates to an overall diameter for the stripping member of about 0.125 inch. Of course, the present invention is not restricted to such a range in its broadest form. Further, the optimal curvature for the surface is related to the gauge and strand count of the wire being stripped.

In one embodiment of the present invention, the wire has two layers of insulation, the surface frictionally engageable with both of the two layers to apply the stripping force thereto. In an embodiment to be illustrated and described, the wire to be stripped is a thermocouple cable having first and second wires surrounded by first and second inner insulation and outer insulation.

In one embodiment of the present invention, the stripping member is composed of a material selected from the group consisting of: (1) metal (perhaps powdered), (2) ceramic and (3) plastic. Those skilled in the art will recognize the materials that have the appropriate physical attributes to act as a stripping member. The present invention contemplates all such materials.

In one embodiment of the present invention, the handle is separable from the stripping member. Alternatively, the handle may be integrally formed with the stripping member as a single piece.

In one embodiment of the present invention, the stripping member is laterally moveable with respect to the insulation to apply the stripping force (usually in the direction of the end to be welded). In the embodiment to be illustrated and described, the apparatus is held laterally (perhaps about 90°) with respect to the wire to be stripped and moved generally along the axis of the wire.

In one embodiment of the present invention, the stripping member urges the insulation against a compliant surface to apply the stripping force. The compliant surface may be a human digit or any other suitable surface for holding the insulation against the stripping member.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same (perhaps automated) purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following description taken in conjunction with the accompanying drawing, in which:

the FIGURE illustrates an exploded view of one embodiment of a thermocouple cable stripping apparatus constructed according to the principles of the present invention.

DETAILED DESCRIPTION

Referring initially to the FIGURE, illustrated is an exploded view of one embodiment of a thermocouple cable stripping apparatus constructed according to the principles of the present invention. A thermocouple cable stripping apparatus, generally designated 100, comprises a stripping member 110 and a handle 120. The stripping member 110 is physically attached at an end 125 of the handle 120. In one advantageous embodiment, the stripping member 110 is a cylindrical body having an irregular outer surface 115 with the radius of curvature of the cylindrical body 110 being less than about 0.0625 inches knurled to 0.07 inches. In other embodiments, the stripping member 110 may be other than circular in cross section. In one embodiment of the present invention, the handle 120 and stripping member 110 may be formed of a single material such as: metal (or powered metal), ceramic or plastic. In an alternative embodiment, the handle 120 and stripping member 110 may be formed separately or of dissimilar materials. For example, the stripping member 110 may be removable from the handle 120, as in a handle 120 having a collet or other device for grasping the stripping member 110. In an alternative embodiment, the stripping member 110 may be formed of a suitable material as described above, and the handle 120 may be molded or thermoplastically formed about the stripping member 110. The handle may take a variety of forms and cross sections while remaining within the scope of the present invention. One who is skilled in the art is familiar with various methods for attaching or forming handles for hand tools.

In one embodiment, the outer surface 115 of the stripping member 110 may be knurled, or otherwise roughened, so as to transmit a frictional force to a thermocouple cable 140. In most thermocouple applications, the thermocouple cable 140 will be dual conductors 141, 142 of dissimilar metals with each conductor being single stranded. The individual conductors 141, 142 may be individually insulated 145, 146 as well as jointly insulated by an outer insulation 148. However, the thermocouple cable 140 may be either single or dual conductor, with each conductor having single strands.

To operate the thermocouple cable stripping apparatus 100, the stripping member 110 is placed against the thermocouple cable 140 and rotated 90° at a minimum stripping distance 150 from the end of the thermocouple cable 140. The minimum stripping distance may be about 1.0 inch in length. While restraining movement of the thermocouple cable 140, a gripping force 170 is applied to the thermocouple cable 140 and against the stripping apparatus 100 by a compliant surface 180. In normal usage, the compliant surface 180 may comprise a human thumb 190. The effect of the gripping force 170 against the thermocouple cable 140 and the stripping apparatus 100, in turn, is to grasp the thermocouple cable 140 between the thumb 190 and the stripping apparatus 100. A stripping force 175 is then applied to the handle 120 and the stripping apparatus 100 is moved along the length of the thermocouple cable 140. The gripping force 170 and the stripping force 175 are transmitted by friction to the insulation 145, 146, and 148, and combine to exceed the tensile strength of the insulation 145, 146, 148. The result of the forces applied to the thermocouple cable 140 while the wire 140 is restrained, is that when the insulation 145, 146, 148 fails, the insulation 145, 146, 148 slides off the individual conductors 141, 142.

While the prior description has focussed on a preferred method of operation of the stripping apparatus 100, one who is skilled in the art will recognize that the gripping force 170 may also be applied by a work bench (not shown). In this embodiment, the stripping apparatus 100 is applied against the thermocouple cable 140 laid on a work surface. The stripping force 175 is then applied to withdraw the thermocouple cable 140 as the insulation 145, 146, and 148 is held against the bench.

Thus, a thermocouple cable stripping apparatus, also known as a FARENSTRIPPER™, has been described to be an inexpensive wire stripping apparatus that reliably and simultaneously removes the outer insulation and the inner insulation from both wires of duplex thermocouple cable without damaging the wire approximately 30 times faster than conventional methods.

From the above, it is apparent that the present invention provides an apparatus for, and method of, stripping insulation from an electrical wire. In one embodiment, the apparatus includes: (1) a stripping member having a curved, irregular surface thereon that is frictionally engageable with the insulation to apply a stripping force thereto and (2) a handle, coupled to an end of the stripping member, that allows a stripping force to be applied to the stripping member.

Although the present invention has been described in detail, those skilled in the art should understand that they can make various changes, substitutions and alterations herein without departing from the spirit and scope of the invention in its broadest form.

What is claimed is:

1. An apparatus for stripping an insulation from conductors within an electrical wire, comprising:

a cylindrically shaped stripping member having a convex outer surface;

a plurality of protrusions on said outer surface, said protrusions having a height sufficient to penetrate into said insulation of said electrical wire without damage to said electrical wire; and a handle, coupled to an end of said stripping member, configured to allow a stripping force to be applied to said stripping member through said handle.

2. The apparatus as recited in claim 1 wherein a radius of curvature of said convex, outer surface is less than about 0.0625 inch.

3. The apparatus as recited in claim 1 wherein said stripping member is composed of a material selected from the group consisting of:

metal, ceramic, and plastic.

4. The apparatus as recited in claim 1 wherein said handle is separable from said stripping member.

5. The apparatus as recited in claim 1 wherein said stripping member is laterally moveable with respect to said insulation to apply said stripping force.

6. The apparatus as recited in claim 1 wherein said stripping member urges said insulation against a compliant surface to apply said stripping force.

7. A method of stripping an insulation from conductors within an electrical wire, comprising:

frictionally engaging said insulation with a convex outer surface of a cylindrically shaped stripping member, said outer surface having a plurality of protrusions thereon, said protrusions having a height sufficient to penetrate into said insulation of said electrical wire without damage to said electrical wire;

applying a stripping force to a handle coupled to an end of said stripping member, said handle allowing said stripping force to be applied to said stripping member, and removing said insulation from said conductors with said stripping member.

8. The method as recited in claim 7 wherein a radius of curvature of said convex, outer surface is less than about 0.0625 inch.

9. The method as recited in claim 7 wherein said stripping member is composed of a material selected from the group consisting of:

metal, ceramic, and plastic.

10. The method as recited in claim 7 wherein said handle is separable from said stripping member.

11. The method as recited in claim 7 further comprising laterally moving said stripping member with respect to said insulation to apply said stripping force.

12. The method as recited in claim 7 further comprising urging, with said stripping member, said insulation against a compliant surface to apply said stripping force.

13. An apparatus for stripping insulation from a thermocouple cable having first and second wires surrounded by a first and a second inner insulation and outer insulation, comprising:

a cylindrically shaped stripping member having a convex outer surface;

a plurality of protrusions on said outer surface, said protrusions having a height sufficient to penetrate into said insulation of said electrical wire without damage to said electrical wire; and a handle, coupled to an end of said stripping member, configured to allow a stripping force to be applied to said stripping member.

14. The apparatus as recited in claim 13 wherein a radius of curvature of said convex, outer surface is less than about 0.0625 inch.

15. The apparatus as recited in claim 13 wherein said stripping member is composed of a material selected from the group consisting of:

metal, ceramic, and plastic.

16. The apparatus as recited in claim 13 wherein said handle is separable from said stripping member.

17. The apparatus as recited in claim 13 wherein said stripping member is laterally moveable with respect to said first and second inner insulation and outer insulation to apply said stripping force.

18. The apparatus as recited in claim 13 wherein said stripping member urges said outer insulation against a compliant surface to apply said stripping force.

* * * * *